United States Patent
Toda

(10) Patent No.: US 8,654,366 B2
(45) Date of Patent: Feb. 18, 2014

(54) MANAGEMENT APPARATUS FOR MANAGING FACSIMILE APPARATUSES, CONTROL METHOD THEREOF, AND STORAGE MEDIUM

(75) Inventor: Kozo Toda, Kokubunji (JP)

(73) Assignee: Canon Kabushiki Kaisha (JP)

( * ) Notice: Subject to any disclaimer, the term of this patent is extended or adjusted under 35 U.S.C. 154(b) by 380 days.

(21) Appl. No.: 12/709,263

(22) Filed: Feb. 19, 2010

(65) Prior Publication Data
US 2010/0214593 A1 Aug. 26, 2010

(30) Foreign Application Priority Data
Feb. 20, 2009 (JP) ................................. 2009-037886

(51) Int. Cl.
*G06K 15/00* (2006.01)
(52) U.S. Cl.
USPC ................. 358/1.14; 358/1.15; 358/426.02; 358/437; 358/468
(58) Field of Classification Search
USPC ................................................ 358/1.1–3.23
See application file for complete search history.

(56) References Cited

U.S. PATENT DOCUMENTS

| | | | |
|---|---|---|---|
| 2004/0083260 A1* | 4/2004 | Kobayashi et al. | 709/201 |
| 2006/0279766 A1* | 12/2006 | Kobayashi | 358/1.14 |
| 2007/0140157 A1* | 6/2007 | Fu et al. | 370/318 |
| 2008/0117475 A1* | 5/2008 | Ozawa et al. | 358/435 |

FOREIGN PATENT DOCUMENTS

JP 8-324072 A 12/1996

* cited by examiner

*Primary Examiner* — Benny Q Tieu
*Assistant Examiner* — Marcellus Augustin
(74) *Attorney, Agent, or Firm* — Rossi, Kimms & McDowell LLP

(57) ABSTRACT

A management apparatus by which one of facsimile apparatuses that externally receives facsimile data is selected based on current power modes of the facsimile apparatuses. Facsimile data can be transmitted from any of a FAX and MFPs on an IP communication network. One of MFPs which are not in a power saving mode is selected by the management apparatus, and a URI of the selected MFP is registered in an SIP server. When facsimile data whose original transmission destination is an MFP which is in a power saving mode is transmitted, the facsimile data is transferred to and alternatively received by the selected MFP.

11 Claims, 16 Drawing Sheets

MANAGEMENT APPARATUS FOR MANAGING FACSIMILE APPARATUSES, CONTROL METHOD THEREOF, AND STORAGE MEDIUM

BACKGROUND OF THE INVENTION

1. Field of the Invention

The present invention relates to a management apparatus for managing facsimile apparatuses, a control method of the management apparatus, and a storage medium storing a program for executing the control method.

2. Description of the Related Art

Conventionally, an MFP (multi-function peripheral) has been known that has plural functions such as copying, printing, scanning, and facsimile transmission/reception functions. To meet a recent demand for energy saving, some MFP is configured that when not in use, a shift is made to a power saving mode (sleep mode) where power consumption is smaller than in a normal power mode (standby mode), so as to reduce power consumption. When the MFP is requested to use its function after having been shifted to the sleep mode, the MFP is restored to the standby mode for execution of the requested function (for example, Japanese Laid-open Patent Publication No. 08-324072).

However, if the MFP is frequently used, a condition for the MFP being shifted to the sleep mode is not satisfied or the MFP is restored to the standby mode immediately after the shift to the sleep mode, posing a problem that a sufficient power-saving effect cannot be achieved.

In particular, in a case that the MFP has a facsimile function, facsimile data is transmitted from an external facsimile apparatus to the MFP, irrespective of in which power mode the MFP currently operates. Thus, at each reception of facsimile data, the MFP must be restored from the sleep mode to the standby mode to output the received facsimile data.

Even in an environment where there are a plurality of MFPs, calling is made to a particular facsimile apparatus for facsimile communication, and therefore, an MFP designated as transmission destination must be restored from the sleep mode to the standby mode for reception and output of facsimile data, even if any other MFP operates in the standby mode.

SUMMARY OF THE INVENTION

The present invention provides a management apparatus that selects at least one of a plurality of facsimile apparatuses, which is to be used to externally receive facsimile data, according to current power modes of the respective facsimile apparatuses, and provides a control method of the management apparatus and a storage medium storing a program for executing the control method.

According to a first aspect of this invention, there is provided a management apparatus for managing a plurality of facsimile apparatuses each at least having a normal power mode and a power saving mode where power consumption is smaller than in the normal power mode and receiving facsimile data via a server, which comprises a detection unit configured to detect current power modes of the plurality of facsimile apparatuses, a selection unit configured to select at least one facsimile apparatus for externally receiving facsimile data from among the plurality of facsimile apparatuses based on a result of detection by the detection unit, and a registration unit configured to register identification information representing the at least one facsimile apparatus selected by the selection unit to the server.

According to a second aspect of this invention, there is provided a control method of a management apparatus for managing a plurality of facsimile apparatuses each at least having a normal power mode and a power saving mode where power consumption is smaller than in the normal power mode and receiving facsimile data via a server, which comprises a detection step of detecting current power modes of the plurality of facsimile apparatuses, a selection step of selecting at least one facsimile apparatus for externally receiving facsimile data from among the plurality of facsimile apparatuses based on a result of detection in the detection step, and a registration step of registering identification information representing the at least one facsimile apparatus selected in the selection step to the server.

According to a third aspect of this invention, there is provided a storage medium storing a program for causing a computer to execute the control method according to the second aspect of this invention.

With this invention, it is possible to provide a management apparatus where a facsimile apparatus for externally receiving facsimile data is selected from a plurality of facsimile apparatuses in accordance with current power modes of the facsimile apparatuses, and a control method thereof and a storage medium. As a result, the facsimile apparatuses are enabled to cooperate with one another and power saving can efficiently be achieved.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
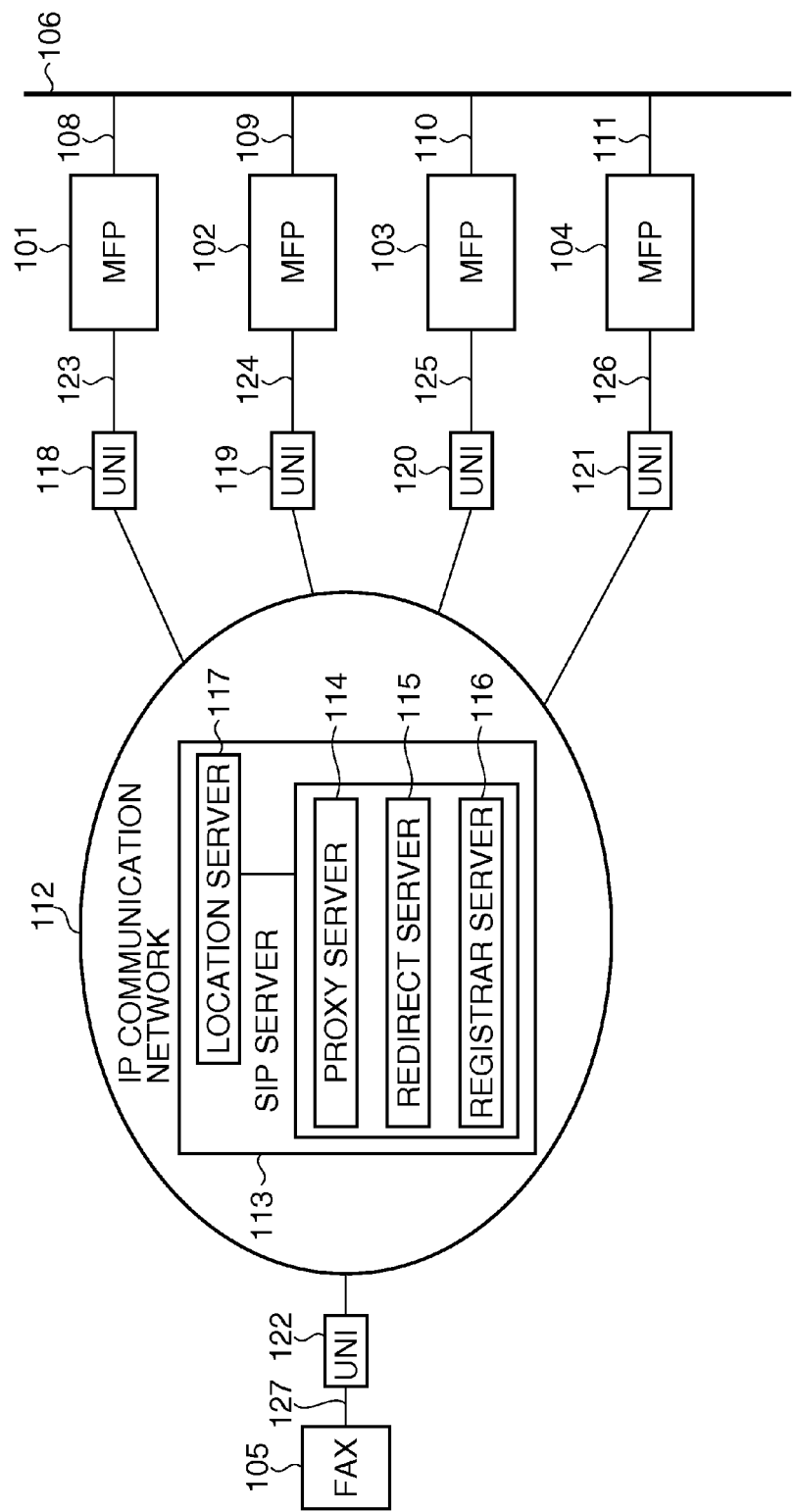
FIG. 1 is a view showing the construction of an information communication network to which a management apparatus according to one embodiment of this invention is applied.

FIG. 1 shows the construction of an information communication network (information communication system) to which a management apparatus according to one embodiment of this invention is applied.

In this information communication network, multi-function peripherals (hereinafter referred to as the MFPs) 101-104 are respectively connected to an IP communication network 112 via communication ports 123-126 and UNIs (user-network interfaces) 118 to 122. The MFPs 101-104 are also connected to a LAN (local area network) 106 via LAN ports 108-111. It should be noted that any one of the MFPs 101-104 servers as the management apparatus (corresponding to a master unit, described later).

A facsimile apparatus (hereinafter referred to as the FAX) 105 is connected via a communication port 127 and a UNI 122 to the IP communication network 112 to which a SIP server 113 is also connected.

The MFPs 101-104 each have functions of copying, printing, scanning, facsimile communication, etc. The FAX 105 is for facsimile use only and has a facsimile communication function alone. It is assumed in this embodiment that the facsimile communication function of the MFPs 101-104 and the FAX 105 is intended for Internet FAX communication according to T.38 proposed in the ITU-T recommendation.

The IP communication network 112 is controlled by IP (Internet protocol) under which the MFPs 101-104 and the FAX 105 perform Internet FAX communication.

The SIP server 113 functions as a call control server and performs call control (session control) for communication via the IP communication network 112 under a SIP (session initiation protocol). In the call control, a user agent (UA) is able to perform communication without concern for a change in IP address of a data transmission destination apparatus, which is caused by, e.g., a movement of the destination apparatus. It should be noted that in this embodiment, the MFPs 101-104 and the FAX 105 operate as user agents (UAs).

The SIP server 113 is comprised of a proxy server 114, a redirect server 115, a registrar server 116, and a location server 117.

The proxy server 114 performs control of transfer of a SIP message, i.e., relays a SIP request from the user agent client (UAC) to the next server (including a user agent server (UAS)). More specifically, the proxy server 114 makes an inquiry to the location server 117 by using, as a key, a transmission destination address contained in a SIP header to determine an IP address of a transmission destination, and decides a message transfer destination based on the determined IP address.

The redirect server 115 decides the next transfer destination of the SIP request, and sends a current address of the next transfer destination back to the request source (UAC), as a reply to the SIP request. In that case, the UAC transmits the SIP request to the returned transfer destination address. The redirect server 115 does not perform a SIP request transfer process, but simply sends the transfer destination address back to the UAC.

Based on the message from the UA, the registrar server 116 registers the current address (a pair of SIP URI and IP address) of the UA on the IP communication network 112. The location server 117 manages a location (address) of the UA on the IP communication network 112. Specifically, the location server 117 receives and registers the pair of SIP URI and IP address from the registrar server 116, and responds to the inquiry from the proxy server 114 based on the registration information.

As will be described later, in this embodiment, one of the MFPs 101-104 is selected as an alternate receiver apparatus (substitute apparatus) for receiving facsimile data on behalf of the other MFPs, and the address (pair of SIP URI and IP address) of the selected MFP is registered in the location server 117.

Next, the construction of the MFPs 101-104 is described with reference to FIG. 2. Under the control of a CPU 201, each of the MFPs 101-104 performs a series of image forming process and facsimile communication process. Specifically, an image reading unit 202 of each MFP optically reads an image of an original by exposure scanning, and photoelectrically converts the read image into electronic image data and outputs the same. A read image processing unit 203 performs various image processing such as shading correction on the image data output from the image reading unit 202.

A record image processing unit 204 converts the image data into print raster image data in order to print and record the image data. Based on the print data from the record image processing unit 204, a recording unit 205 performs printing on a recording sheet using a printing method such as an electrophotographic method.

A ROM 206 stores various programs for execution by the CPU 201, which include programs programmed for execution of processes shown in FIGS. 3 to 16. The CPU 201 uses a RAM 207 as, e.g., a work area during the execution of programs. A HDD 208 stores image data, setting data, apparatus profile information (e.g., URIs of the MFPs 101-104), identification information (apparatus ID) of one of the MFPs 101-104 which is selected as an alternate receiver apparatus.

A timer unit 209 measures time for use by the CPU 201 to carryout timer-based control, e.g., to decide timing of shift to a sleep mode. An operation unit 210 includes a key input section and a display section. Key input information input via the key input section is echo displayed on the display section. A SIP call controller 211 performs a call control operation by SIP for the IP communication network 112 at facsimile communication. A T38 controller 212 performs control for execution of Internet facsimile communication according to T.38 stipulated in ITU-T recommendation at facsimile communication.

A communication network IF controller 213 performs IF control to connect the MFP via a communication port 214 to the IP communication network 112 for facsimile communication. The communication port 214 in FIG. 2 corresponds to any one of the communication ports 123-126 of the MFPs 101-104 in FIG. 1.

A LAN controller 216 performs LAN communication control via a LAN port 217. The LAN port 217 in FIG. 2 corresponds to any one of the LAN ports 108-111 of the MFPs 101-104 in FIG. 1.

Next, a description will be given of the outline of power supply control for the blocks (electronic devices) of the MFP shown in FIG. 2.

Figure 2:
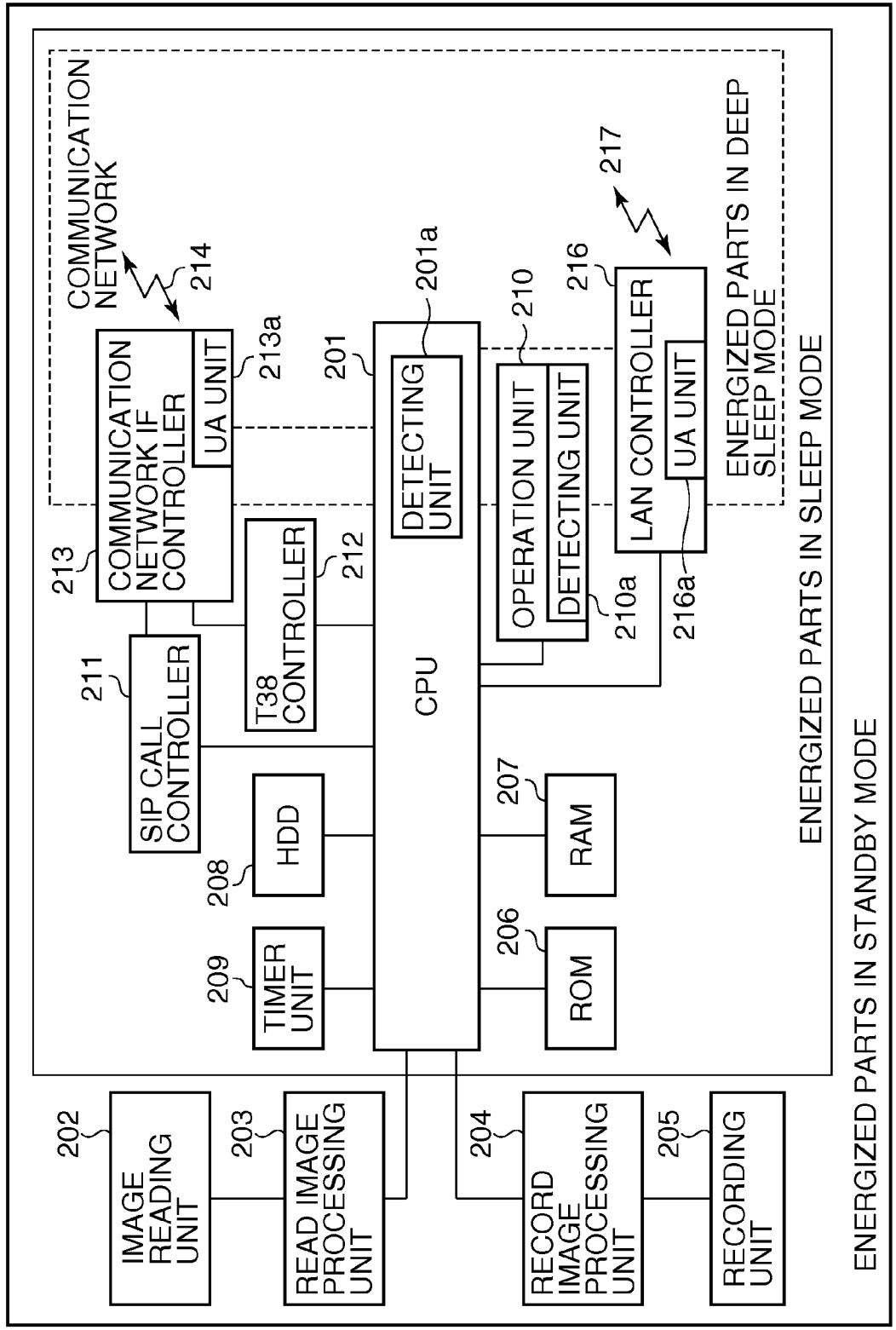
FIG. 2 is a block diagram showing the construction of each of MFPs shown in FIG. 1.

In a standby mode (normal power mode), parts of the MFP surrounded by a bold solid line in FIG. 2 (i.e., all the electronic devices mounted on the MFP) are energized. Thus, in the standby mode (normal power mode), electric power is supplied to the record image processing unit 204 and the recording unit 205. As a result, a fixing heater (not shown) of the recording unit 205 that requires large electric power is energized. Therefore, power consumption is large in the standby mode although the recording unit 205 is able to immediately perform printing and recording when print raster image data is input from the record image processing unit 204.

In a sleep mode (power saving mode), parts of the MFP surrounded by a fine solid line in FIG. 2 (i.e., electronic devices other than the image reading unit 202, the read image processing unit 203, the record image processing unit 204, and the recording unit 205) are energized. As a result, power consumption in the sleep mode is reduced than in the standby mode.

In a deep sleep mode (power saving mode), parts of the MFP surrounded by a dotted line in FIG. 2 are kept energized. Specifically, a part (UA unit 213a) of the communication network IF controller 213 for detecting a calling signal incoming at the communication port 214 from the IP communication network 112, a part (UA unit 216a) of the LAN controller 216 for transmitting and receiving a predetermined packet to and from the LAN port 217, and a part (detecting unit 210a) of the operation unit 210 for detecting a key input operation signal are kept energized.

It is assumed that the parts 210a, 213a, and 216a kept energized in the deep sleep mode are directly connected to the CPU 201, and a part (detecting unit 201a) of the CPU 201 for detecting the signals and for activating the parts 210a, 213a, and 216a is energized. In the deep sleep mode, power consumption is further reduced than in the sleep mode.

Since the CPU 201 built in the MFP has the part (detecting unit 201a) kept energized even in the deep sleep mode, the CPU is always capable of recognizing the power mode (standby mode, sleep mode, or deep sleep mode) in which the MFP operates. Thus, the CPU 201 of the MFP is capable of transmitting a packet to notify the power mode of the MFP to another MFP via the LAN port 217, irrespective of the power mode (standby mode, sleep mode, or deep sleep mode) in which the MFP operates. It should be noted that each of the UA units 213a, 216a is configured to realize its function by software, and includes a memory for storing the software.

Next, a description will be given of the outline of transitions between the deep sleep mode, the sleep mode, and the standby mode. For the mode transitions (shifts), the timer unit 209 measures a time period for which functions of the MFP are not used.

First, a shift from the standby mode to the sleep mode or the deep sleep mode is described. In a case that the MFP is in the standby mode, when a time period during which functions of the MFP are not used becomes equal to or larger than a threshold value representing a condition for the MFP being shifted to the sleep mode, the CPU 201 stops energizing the read image processing unit 203, the record image processing unit 204, and the recording unit 205, whereby a shift is made to the sleep mode.

When the time period for which functions of the MFP are not used becomes equal to or larger than a threshold value representing a condition for the MFP being shifted to the deep sleep mode, the CPU 201 stops energizing the ROM 206, the RAM 207, the HDD 208, the timer unit 209, the SIP call controller 211, and the T38 controller 212. Further, the CPU 201 stops energizing parts of the communication network IF controller 213, the LAN controller 216 and the operation unit 210 other than the UA units 213a, 216a and the detecting unit 210a. The CPU 201 also stops energizing parts of the CPU 201 other than the detecting unit 201a for detecting signals from the UA units 213a, 216a and the detecting unit 210a and for activating these units.

Next, a shift from the deep sleep mode to the sleep mode and to the standby mode is described. Even when the MET is in the deep sleep mode, the UA unit 216a of the LAN controller 216 is able to receive a predetermined packet via the LAN port 217, and the CPU 201 is able to detect the packet reception.

In the deep sleep mode, the UA unit 213a of the communication network IF controller 213 is able to detect a ringing signal from the IP communication network 112 via the communication port 214, and the CPU 201 is able to detect a resultant detection signal. The detecting unit 210a of the operation unit 210 is able to detect a key input signal even in the deep sleep mode, and the CPU 201 is able to detect a resultant detection signal.

When detecting any of the detection signals, the CPU 201 provides power supply for the sleep mode to make a shift to the sleep mode, and determines the necessary function based on, e.g., a type of the detection signal. Based on a result of the determination, the CPU 201 appropriately restarts energizing the image reading unit 202, the read image processing unit 203, the record image processing unit 204, and the recording unit 205, whereby the standby mode is gradually restored.

Next, operations of the MFPs 101-104 will be described in detail. It is assumed that information representing power consumption at printing operation in the standby mode is stored in advance in the HDD 208 of each MFP, as apparatus profile information unique to the MFP. For example, at factory shipment, power consumption at printing operation is measured and input via the operation unit 210, and is stored as the apparatus profile information in the HDD 208 under the control of the CPU 201. Instead of storing the power consumption at printing operation, power consumption in the standby mode in a state where printing operation is not performed can be stored.

In respect of facsimile reception function, the MFPs 101-104 each have a normal reception mode where received facsimile data is immediately printed and a memory reception mode where received facsimile data is not immediately printed, but temporarily stored in a memory and printed, e.g., when a printing instruction is given by a user.

In the facsimile data reception process in the normal reception mode, since the received facsimile data is printed by the recording unit 205, power supply for the standby mode is required. On the other hand, in the facsimile data reception process performed in the memory reception mode, since facsimile data is not printed but simply stored in the HOD 208 at data reception, facsimile data reception can be made while providing power supply for the sleep mode, and hence power supply for the standby mode is not required.

In other words, in a case that the memory reception mode is set, even if the deep sleep mode is selected as the power supply mode, it is unnecessary that the power supply mode be restored at once to the standby mode in order to receive facsimile data. This corresponds to the above described operation where the standby mode is gradually restored. It should be noted that information setting of the normal reception mode or the memory reception mode is also stored in the HDD 208.

The MFPs 101-104 are each capable of performing facsimile communication with the IP communication network 112 by the SIP call controller 211. In that case, each of the MFPs 101-104 registers its own URI (uniform resource identifier) to the SIP server 113, more specifically, to the location server 117.

Figure 3:
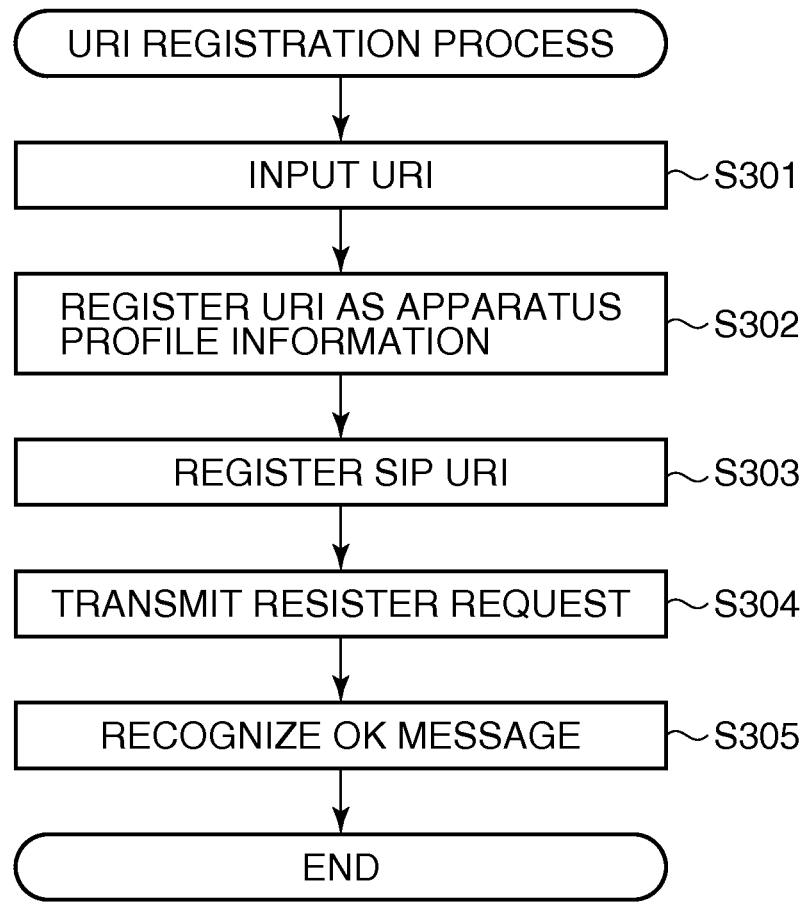
FIG. 3 is a flowchart showing an own URI registration process performed by each MFP.
Figure 4:
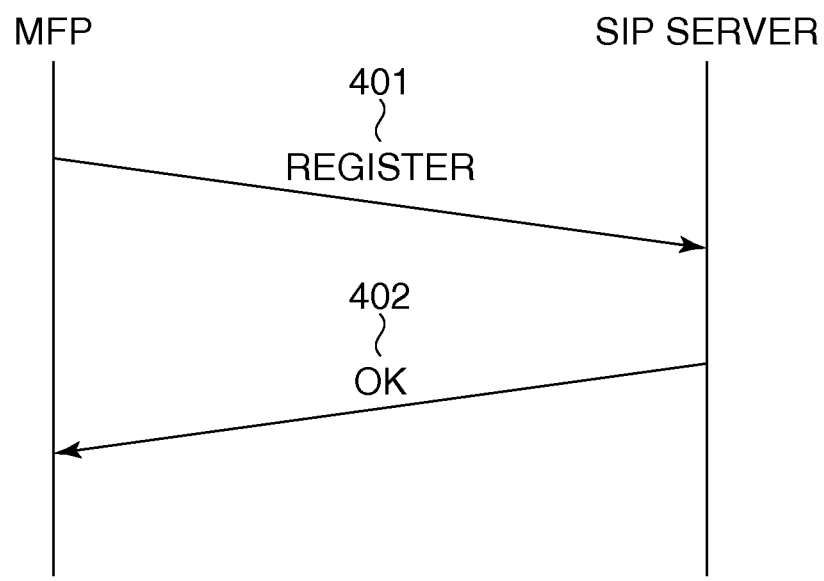
FIG. 4 is a sequence diagram showing the own URI registration process performed by each MFP.

In the following, a URI registration process is described with reference to FIGS. 3 and 4. For convenience of description, it is assumed that the MFP 101 registers its own URI. An operator inputs the URI of the MFP 101 by operating the operation unit 210 of the MET 101 (S301). When detecting the URI being input, the CPU 201 of the MFP 101 (hereinafter simply referred to as the CPU 201) registers the input URI as apparatus profile information into the HDD 208 (S302).

At the same time, the CPU 201 transfers the input URI to the SIP call controller 211 and gives an instruction to register the SIP URI (S303). The SIP call controller 211 transmits a RESISTER request 401 containing URI information (SIP URI and IP address) to be registered. The RESISTER request 401 is transmitted to the SIP server 113 via the communication network IF controller 213, the communication port 123, the UNI 118, and the IP communication network 112 (S304).

The SIP server 113 analyzes the RESISTER request 401 by the registrar server 116, and recognizes that a transmission source of the RESISTER request 401 is the MFP 101 corresponding to the communication port 123 connected to the UNI 118. As information representing the MFP corresponding to the communication port 123, the SIP server 113 registers identification information of the MFP 101 and the URI information contained in the transmitted RESISTER request 401 into the location server 117.

After the URI information is normally registered, the SIP server 113 transmits an OK message 402 to the MFP 101. The OK message 402 is transmitted to the communication network IF controller 213 via the IP communication network 112, the UNI 118, and the communication port 214, and is recognized by the SIP call controller 211 (S305).

As a result, the CPU 201 recognizes that the URI has normally been registered, and completes the URI registration process. The same URI registration process is also executed in cases that the MFPs 102-104 register their own URIs into the SIP server 113.

Communications between the MFPs 101-104 and the SIP server 113 are conducted through the above described paths. In the following, a description will be given mainly of a transmission source and a transmission destination, with a description of an intermediate path omitted where possible.

In this embodiment, it is assumed that the URIs of the MFPs 101-104 are sip:+8112-345-6780@abc.com, sip:+8112-345-6781@abc.com, sip:+8112-345-6782@abc.com, and sip:+8112-345-6783@abc.com.

Figure 5:
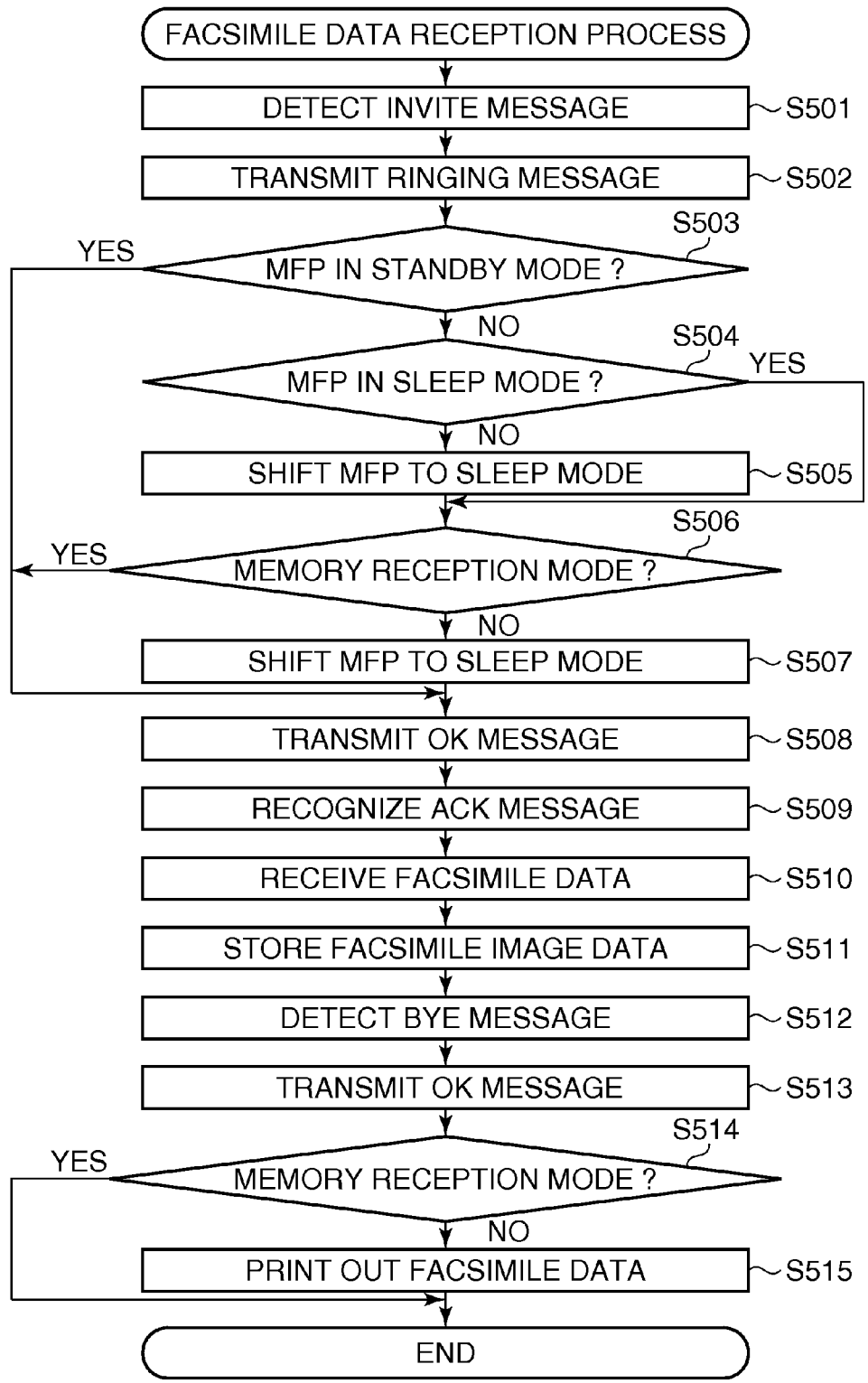
FIG. 5 is a flowchart showing a facsimile data reception process where each MFP independently receives facsimile data.
Figure 6:
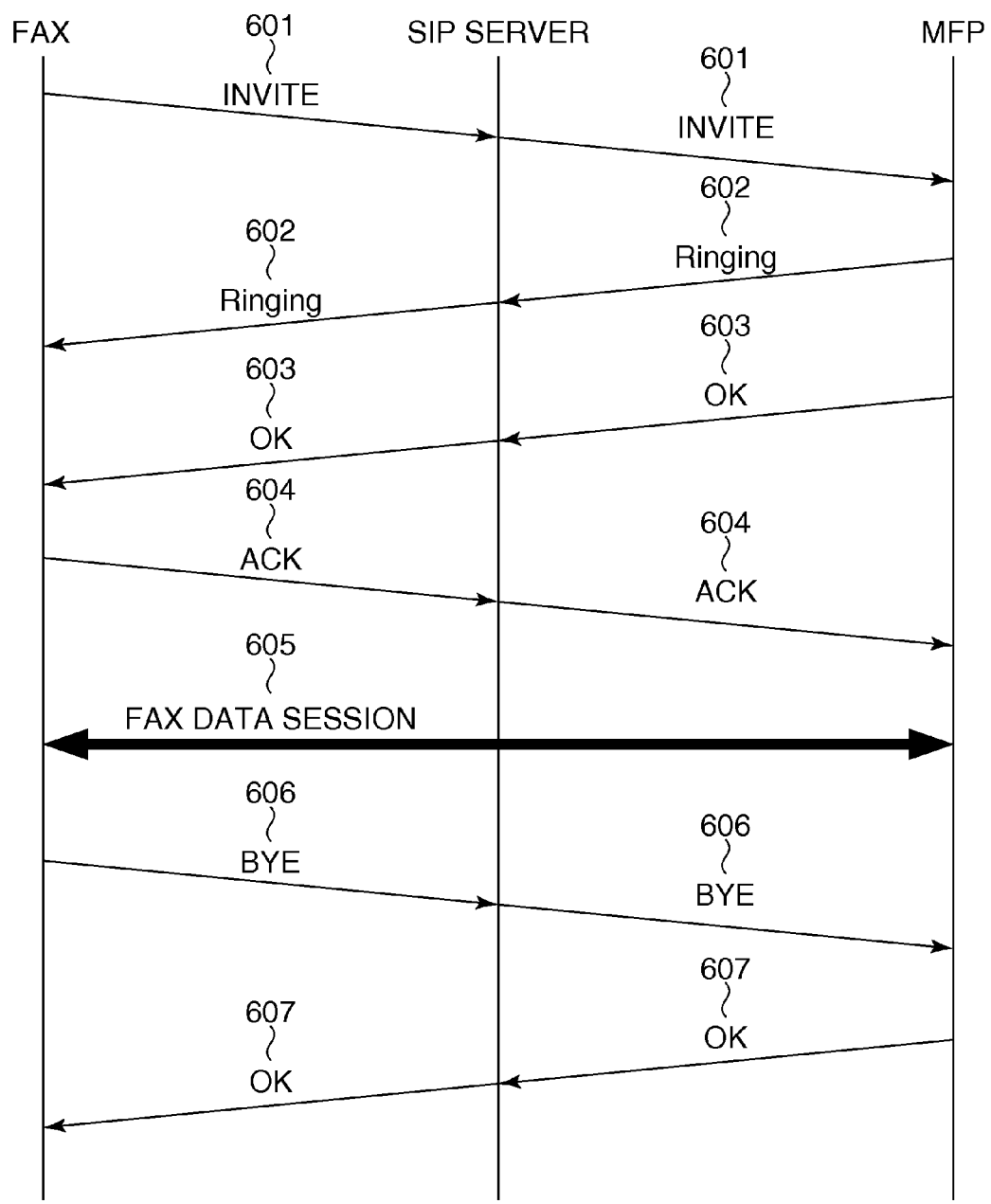
FIG. 6 is a sequence diagram showing the reception process where each MFP independently receives facsimile data.

Next, with reference to FIGS. 5 and 6, a description will be given of a reception process where the MFPs 101-104 receive facsimile data in a state that these MFPs operate independently of one another. In the following, a facsimile data reception process performed by the MFP 102 will be described. The same reception process is also performed by each of the other MFPs 101-104 to receive facsimile data.

The FAX 105 transmits an INVITE message 601 via the UNI 122 to the IP communication network 112 in order to establish a session with the MFP 102 having a URI of sip:+8112-345-6781@abc.com, which is a transmission destination. The INVITE message 601 is recognized by the SIP server 113.

Specifically, the location server 117 of the proxy server 114 recognizes that the URI "sip:+8112-345-6781@abc.com" contained in the INVITE message 601 is the URI of the MFP 102 connected to the UNI 119, and the SIP server 113 transfers the INVITE message 601 to the MFP 102.

The INVITE message 601 arriving at the communication port 124 of the MFP 102 is detected by the UA unit 213a of the communication network IF controller 213 and is detected by the CPU 201 of the MFP 102 (ditto in the following description of the reception process) (S501). The CPU 201 transmits to the communication port 124 via the communication network IF controller 213 a Ringing message 60 representing that calling is being performed by the SIP call controller 211 (S502).

The Ringing message 602 is transmitted via the UNI 119 to the IP communication network 112, and the SIP server 113 transfers this Ringing message 602 to the FAX 105. Based on the transferred Ringing message 602, the FAX 105 recognizes that the transmission destination MFP 102 is being called.

After the transmission of the Ringing message 602, the CPU 201 determines a current power mode (standby mode, sleep mode, or deep sleep mode) of the MFP 102, thereby determining whether the MFP 102 is in the standby mode (S503).

When determining that the MFP 102 is in the standby mode, the CPU 201 determines that a facsimile data reception process can be executed, and immediately proceeds to step S508 where an OK message 603 is transmitted to the FAX 105 via the SIP server 113. On the other hand, when determining that the MFP 102 is not in the standby mode, the CPU 201 determines whether the MFP 102 is in the sleep mode (S504). When determining that the MFP 102 is in the sleep mode, the CPU 201 proceeds to step S506 in order to confirm a reception mode. On the other hand, when determining that the MFP 102 is not in the sleep mode, i.e., the MFP 102 is in the deep sleep mode, the CPU 201 shifts the MFP 102 to the sleep mode (S505), and then proceeds to step S506.

In step S506, the CPU 201 determines whether a memory reception mode is set as the reception mode (S506). When determining that the memory reception mode is set, the CPU 201 proceeds to step S508 since a facsimile data reception process in the memory reception mode can be performed even in the current sleep mode. In step S508, the CPU 201 transmits an OK message 603 to the FAX 105 via the SIP server 113.

On the other hand, if the memory reception mode is not set, but the normal reception mode is set, the CPU 201 shifts the MFP 102 to the standby mode (S507) since a printing operation is required in the normal reception mode, and then proceeds to step S508 where the CPU 201 instructs the SIP call controller 211 to transmit an OK message 603 to the FAX 105 via the SIP server 113.

When receiving the OK message 603, the FAX 105 transmits an ACK message 604 via the SIP server 113 to the MFP 102. The CPU 201 recognizes the ACK message 604 (S509), whereby a communication session (line connection) 605 is established between the FAX 105 and the MFP 102 so that communication becomes possible. Then, the FAX 105 transmits facsimile data via the SIP server 113 to the MFP 102, and the CPU 201 receives the facsimile data (S510).

The transmission and reception of the facsimile data is performed according to T.38 protocol stipulated by the ITU-T. The CPU 201 converts the received facsimile data into facsimile image data and stores the converted data into the HDD 208 (S511).

At completion of the facsimile data transmission, the FAX 105 transmits a BYE message 606 representing the completion of communication to the MFP 102 via the SIP server 113. The BYE message 606 is detected by the IP call controller 211, and the CPU 201 recognizes that the communication is completed (S512).

Next, the CPU 201 controls the SIP call controller 211 to transmit an OK message 607 to the FAX 105 via the SIP server 113 (S513), and determines whether the memory reception mode is set as the reception mode (S514). If it is determined that the memory reception mode is set, the CPU 201 immediately completes the facsimile data reception process.

On the other hand, if the normal reception mode is set, the CPU 201 reads the currently received facsimile data (facsimile image data) from the HDD 208, and transfers the read facsimile data to the record image processing unit 204 to print out the facsimile data (S515).

As described above, in a case that the reception process is executed by the MFPs 101-104 independently of one another, each MFP executes by itself the facsimile data reception process when receiving facsimile directed to the MFP itself. As a result, each MFP is required to change the power mode, where necessary, when receiving facsimile directed to the MFP itself, and cannot achieve sufficient power-saving.

To obviate this, in this embodiment, the MFPs 101-104 cooperate to achieve alternate facsimile data reception, so as to adequately achieve power saving for the MFPs 101-104 as a whole.

In the following, an alternate facsimile data reception process cooperatively performed by the MFPs 101-104 will be described in detail.

Figure 7:
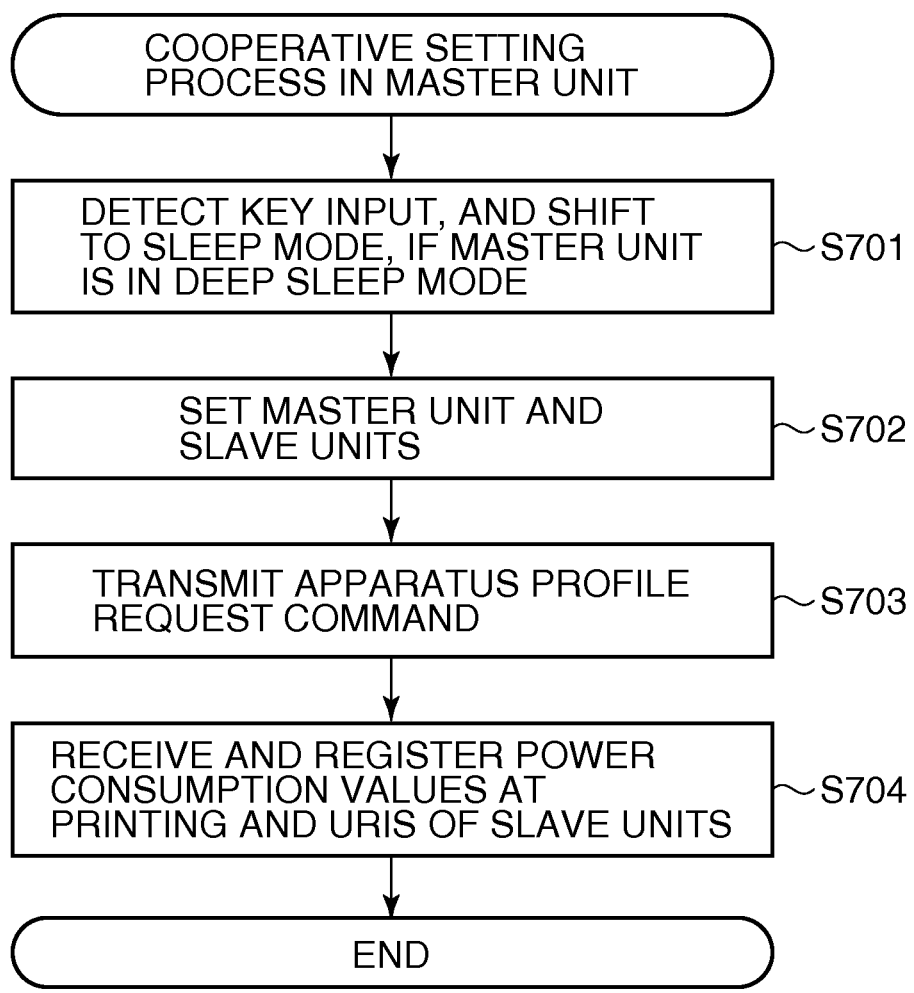
FIG. 7 is a flowchart showing a cooperative setting process performed by an MFP serving as a master unit.
Figure 8:
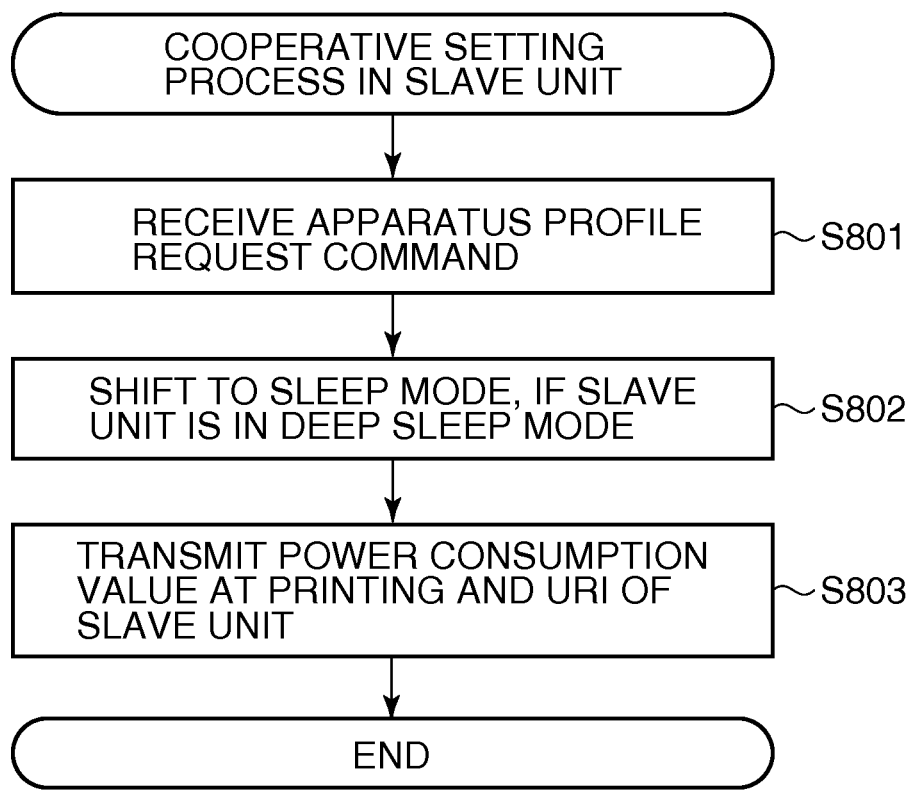
FIG. 8 is a flowchart showing a cooperative setting process performed by an MFP serving as a slave unit.

First, with reference to FIGS. 7 and 8, a description will be given of cooperative setting processes for a case where the MFP 101 serves as a master unit (management apparatus) and the MFPs 102 to 104 serve as slave units. FIG. 7 shows in flowchart a cooperative setting process performed by the MFP 101 serving as the master unit, and FIG. 8 shows in flowchart a cooperative setting process performed by each of MFPs 102 to 104 serving as the slave unit.

It should be noted that the below-described processes are performed in a strict sense by the CPUs 201 of the MFPs 101-104, however, in the following description, these processes are described as being performed by the MFPs 101-104.

The MFP 101 serving as the master unit detects a key input signal for cooperative setting from the detecting unit 210a of the operation unit 210, and performs control to make a shift to the sleep mode, if the MFP 101 is in the deep sleep mode (S701).

The shift to the sleep mode is performed for execution of processing in subsequent steps, which can sufficiently be executed even in the sleep mode. To achieve power saving as much as possible, the power mode shift is not made at once from the deep sleep mode to the standby mode, but to the sleep mode (ditto in S802 in FIG. 8).

When detecting the key input signal, the MFP 101 sets a master-slave relation where the MFP 101 is a master unit and the MFPs 102 to 104 are slave units, and registers the master-slave relation into the HOD 208 (S702). It should be noted that a user is able to input the key input signal for the master-slave relation setting by selecting a relevant item from a menu displayed on the display section of the operation unit 210 and by operating the key input section of the operation unit 210.

The MFP 101 transmits an apparatus profile request command from the LAN controller 216 to the slave units (particular facsimile apparatuses) via the LAN 106 (S703). Each of the slave units (MFPs 102 to 104) receives the apparatus profile request command (S801), and performs control to make a shift from the deep sleep mode to the sleep mode, if the slave unit is in the deep sleep mode (S802).

Next, each of the slave units reads a power consumption value at printing and own URI from the own HDD 208, and transmits them to the master unit (MFP 101) as a reply to the apparatus profile request command (S803).

The master unit (MFP 101) registers power consumption values at printing and the URIs received from the slave units into the HDD 208 so as to correspond to respective ones of identification information of the slave units (S704).

Next, with reference to FIGS. 9 to 11, a description will be given of a process for selecting an alternate receiver apparatus (substitute apparatus) that alternatively receives facsimile data. The process for selecting an alternate receiver apparatus is performed by the master unit according to, e.g., the power modes of the MFPs 101-104. To this end, the master unit (MFP 101) detects the power modes of the slave units (MFPs 102 to 104). To provide cooperation for the detection processing, each slave unit periodically transmits its own current power mode information to the master unit.

Figure 9:
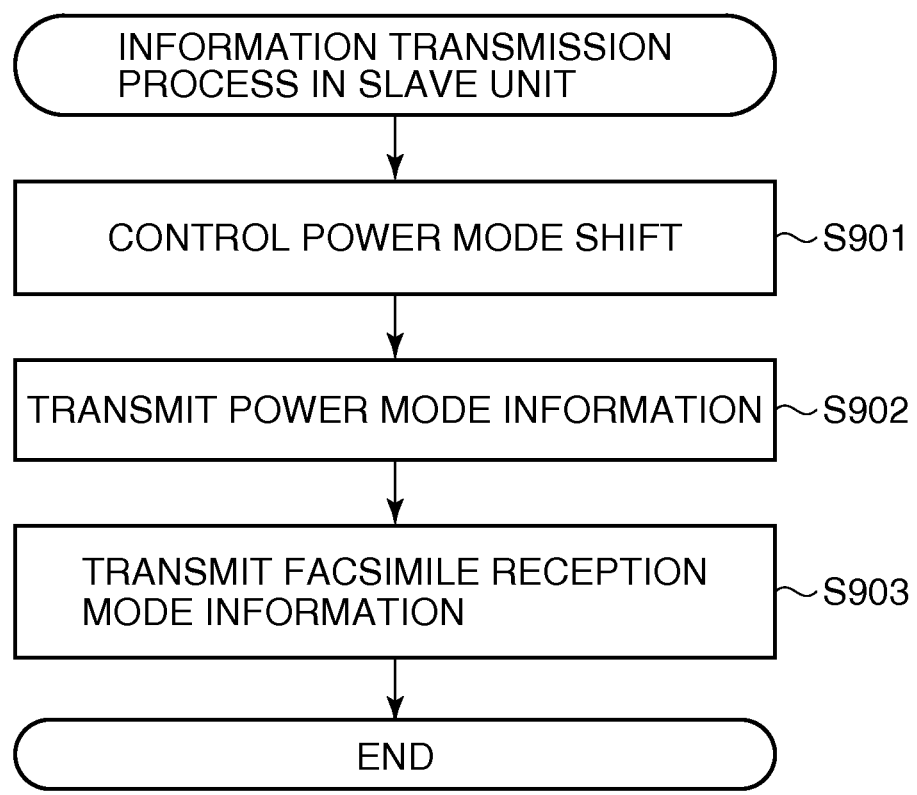
FIG. 9 is a flowchart showing an information transmission process performed by the slave unit to transmit information for use in selecting an alternate receiver apparatus.

Specifically, as shown in FIG. 9, each slave unit (each of the MFPs 102 to 104) is able to shift its own power mode to any of the standby mode, the sleep mode, and the deep sleep mode according to a use state of its own function (S901). When a shift is made in the own power mode, each slave unit notifies the power mode after shift to the master unit via the LAN 106 (S902).

Next, the slave unit reads information on its facsimile reception mode (normal reception mode or memory reception mode) set in its HDD 288, and transmits the read information to the master unit via the LAN 106 (S903).

When determining that information is received via the LAN 106 (S1001 in FIG. 10), the master unit (MFP 101) determines whether the received information is information on power mode and facsimile reception mode transmitted from any of the slave units (S1002). If the received information is not information on power mode and facsimile reception mode, the master unit performs processing (not shown) in accordance with the received information, and returns to step S1001.

On the other hand, if the received information is information on power mode and facsimile reception mode, the master unit performs an alternate receiver apparatus selection process (S1003). It is assumed, for example, that the power mode of the MFP 102 shifts from the standby mode to the sleep mode, with the URI of the MET 102 registered in the SIP server 113 as URI information representing an apparatus for externally receiving facsimile data. In that case, if the MET 102 having shifted to the sleep mode receives a facsimile directed thereto from outside (e.g., from the FAX 105), the MFP 102 is required to return to the standby mode. If the MFP 102 frequently receives facsimiles directed to the MFP 102, a time period during which the MFP 102 is in the sleep mode becomes short, and a sufficient energy saving effect cannot be achieved.

To obviate this, the MFP 101 (master unit) selects an alternate receiver apparatus for externally receiving facsimile data on behalf of the MFP 102 (principal apparatus) (S1003). Then, the MFP 101 performs a redirect registration process to register the URI of the selected alternate receiver apparatus and the URI of the principal apparatus to the SIP server 113 (S1004), and returns to step S1001.

In the information transmission process in FIG. 9, when there occurs a change in power mode of the slave unit, the slave unit notifies the master unit of the power mode after change. Alternatively, the master unit can periodically inquire each of the slave units and detect the power modes of the slave units.

In the process of FIG. 9, each slave unit notifies information on its facsimile reception mode to the master unit, as an annex to the notification of power mode information. However, the slave unit can notify the facsimile reception mode after change independently of the notification of power mode information. In that case, the master unit is able to recognize without delay the occurrence of shift from memory reception mode to normal reception mode in the slave unit and promptly register an alternate receiver apparatus, whereby the chance of the slave unit becoming a principal apparatus increases, and it is therefore possible to further reduce power consumption.

Figure 10:
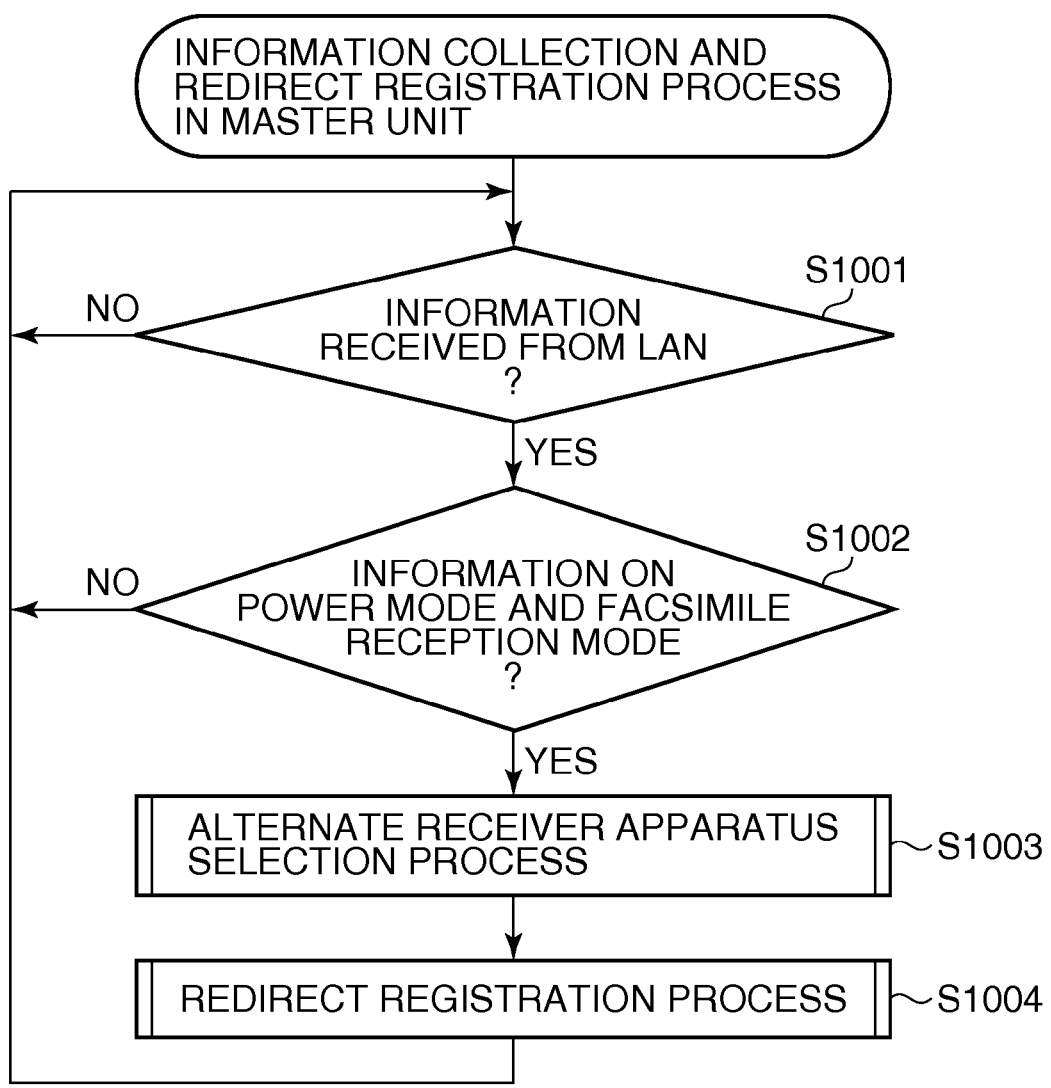
FIG. 10 is a flowchart showing an information collection process for collecting information for use in selecting the alternate receiver apparatus and a redirect registration process, which are executed by the master unit.
Figure 11:
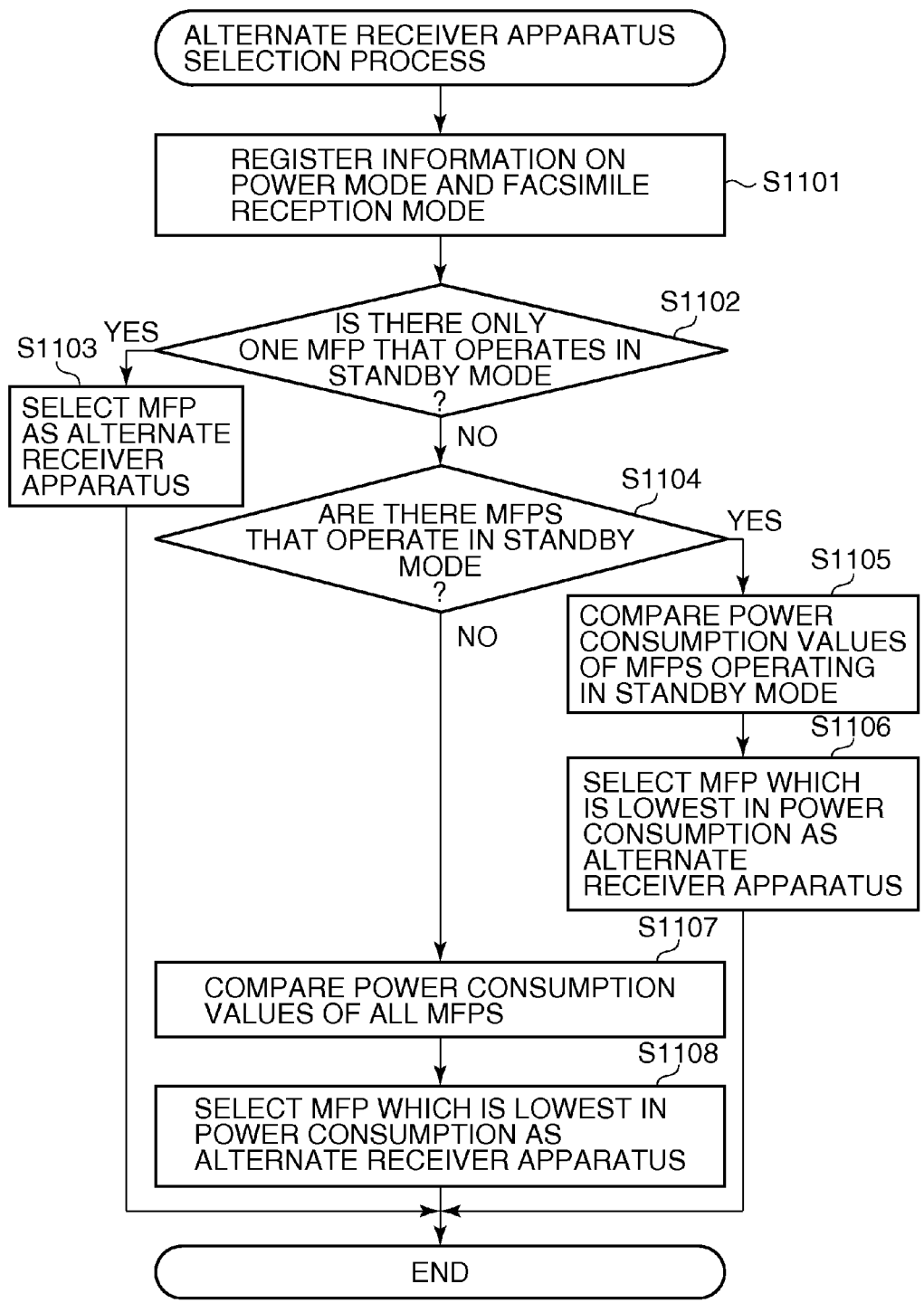
FIG. 11 is a flowchart showing the details of an alternate receiver apparatus selection process performed in S1003 in FIG. 10.

Next, with reference to FIG. 11, the alternate receiver apparatus selection process performed in S1003 in FIG. 10 is described in detail.

If it is determined in step S1002 in FIG. 10 that the received information is information on power mode and facsimile reception mode from any of the slave units, the master unit registers the mode information into the HDD 208 so as to correspond to identification information of the slave unit (S1101).

In this embodiment, the master unit collects information actively transmitted from the slave units, thereby always grasping the latest power modes and facsimile reception modes of the master and slave units.

As a result, as compared to a case where the master unit periodically inquires the slave units to collect information, the alternate receiver apparatus can be registered earlier and the chance for each slave unit of becoming a principal apparatus increases, whereby power consumption can efficiently be reduced.

The master unit determines whether there is only one MFP that operates in the standby mode among the master unit and the slave units (S1102). If it is determined that there is only one MFP that operates in the standby mode, the master unit selects the one MFP as an alternate receiver apparatus for facsimile data reception, and registers information representing the selected MFP into the HDD 208 (S1103).

If the number of MFPs that operate in the standby mode is not equal to one, the master unit determines whether there are a plurality of MFPs that operate in the standby mode (S1104). When determining that there are a plural number of MFPs that operate in the standby mode, the master unit compares power consumption values of these MFPs at printing operation (S1105).

Then, the master unit selects the MFP which is the lowest in power consumption at printing operation from among the MFPs which are in the standby mode, as an alternate receiver apparatus for facsimile data reception, and registers information representing the selected MFP in the HDD 208 (S1106), thereby enhancing the efficiency of reduction of power consumption.

If it is determined in step S1104 that there are no plural MFPs which are in the standby mode, i.e., if there is no MFP that operates in the standby mode among the master unit and the slave units, the master unit compares power consumptions of all the MFPs (the master and slave units) at printing operation (S1107), and selects, as an alternate receiver apparatus for facsimile data reception, the MFP which is the lowest in power consumption at printing from among the MFPs (all of the master and slave units) which are in the non-standby mode. Then, the master unit registers information representing the selected MFP in the HDD 208 (S1108).

In a case that the MFP not in the standby mode is selected as the alternate receiver apparatus, the selected MFP can be in either the sleep mode or the deep sleep mode at the time of alternate reception. In that case, processing in steps S503 to S507 in FIG. 5 is performed to enable the selected MFP to shift to a power mode for alternate reception (either standby mode or sleep mode).

Alternatively, an instruction to shift to the standby mode or the sleep mode can be given to the alternate receiver apparatus. In that case, however, the timing where the alternate receiver apparatus shifts to the standby mode or the sleep mode becomes earlier than in a case where the shift is made at the same time as alternate reception, resulting in a decreased efficiency of power saving.

As apparent from the foregoing description, it is possible to designate the master unit as an alternate receiver apparatus or as a principal apparatus.

Figure 12:
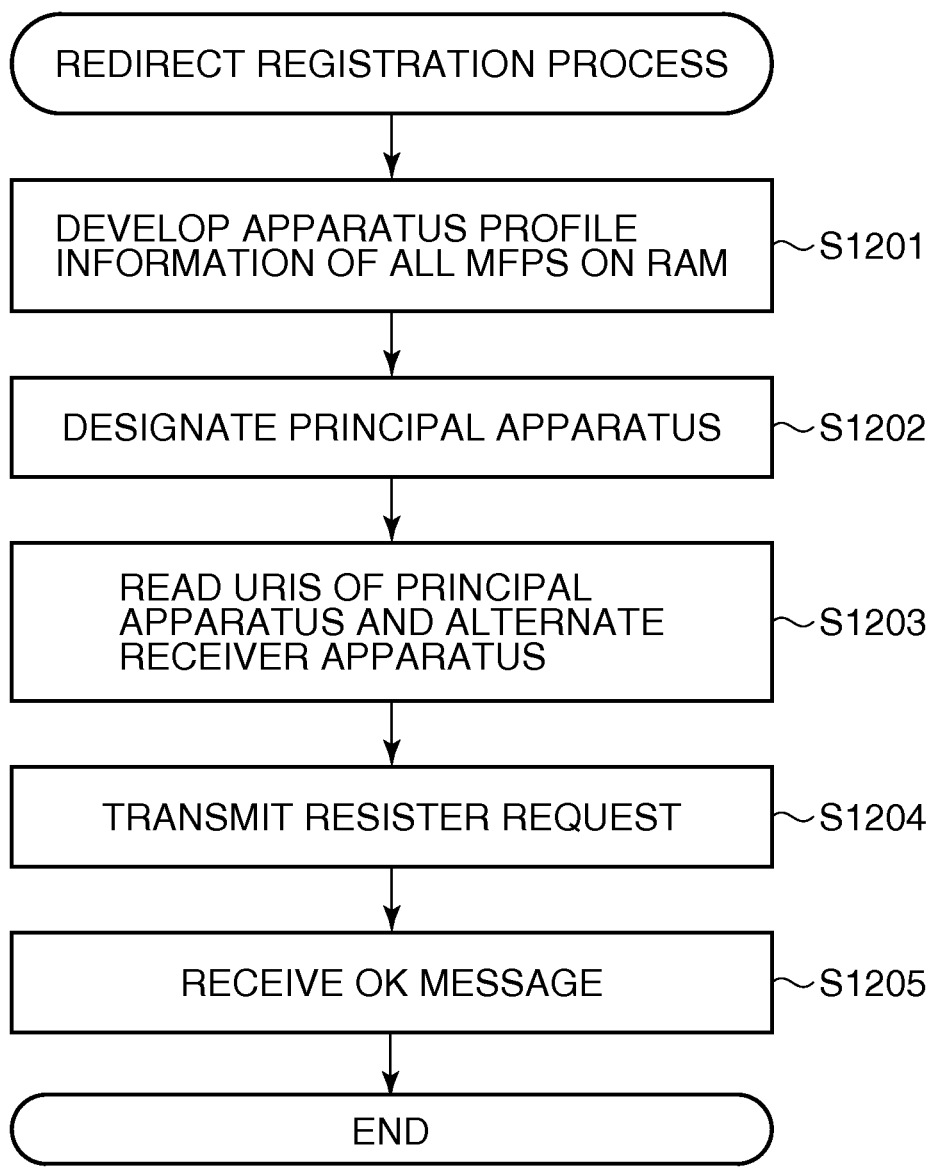
FIG. 12 is a flowchart showing the details of the redirect registration process performed in S1004 in FIG. 10.

Next, the redirect registration process performed in S1004 in FIG. 10 is described in detail with reference to FIG. 12.

The master unit (MFP 101) reads from the HDD 208 apparatus profile information of all the MFPs 101-104 that cooperatively operate with one another, and develops the information on the RAM 207 (S1201). These apparatus profile information include information representing the URIs, power modes, facsimile reception modes, and communication ports of the MFPs 101-104, and information representing the MFP selected as the alternate receiver apparatus.

Next, the master unit designates each of one or more MFPs that operate in the sleep mode or the deep sleep mode as a principal apparatus (i.e., MFP for which redirection is to be performed) (S1202). This designation processing is performed by referring to the apparatus profile information developed on the RAM 207.

Then, the master unit reads from the RAM 207 the URI of each principal apparatus and the URI and communication port of the alternate receiver apparatus (substitute apparatus) (S1203). Next, the master unit transmits to the SIP server 113 a RESISTER request indicating that facsimile data whose transmission destination is the URI of each principal apparatus should be transferred (redirected) to the alternate receiver apparatus (more specifically, to the URI and communication port thereof) (S1204). In that case, the registrar server 116 of the SIP server 113 analyzes the RESISTER request.

Then, the redirect server 115 performs redirect registration to the location server 117 such that the alternate receiver apparatus is set as the transfer destination of facsimile data whose original transmission destination is each principal apparatus. After the redirect registration is normally performed, the SIP server 113 transmits an OK message to the master unit.

The master unit receives the OK message (S1205), and completes the redirect registration process.

With the redirect registration, facsimile data directed to any of MFPs which are in the sleep mode or the deep sleep mode is transferred to the alternate receiver apparatus which basically operates in the standby mode.

Needless to say, facsimile data whose original transmission destination is the URI of the alternate receiver apparatus is not redirected but directly transmitted to the alternate receiver apparatus according to the registration setting of the URI of the alternate receiver apparatus in the SIP server 113.

Next, a facsimile data alternate reception process performed by the alternate receiver apparatus will be described with reference to FIG. 13. It is assumed, for convenience, that the MFP 103 is registered as the alternate receiver apparatus to the SIP server 113 and the MFP 102 is registered as the principal apparatus.

Figure 13:
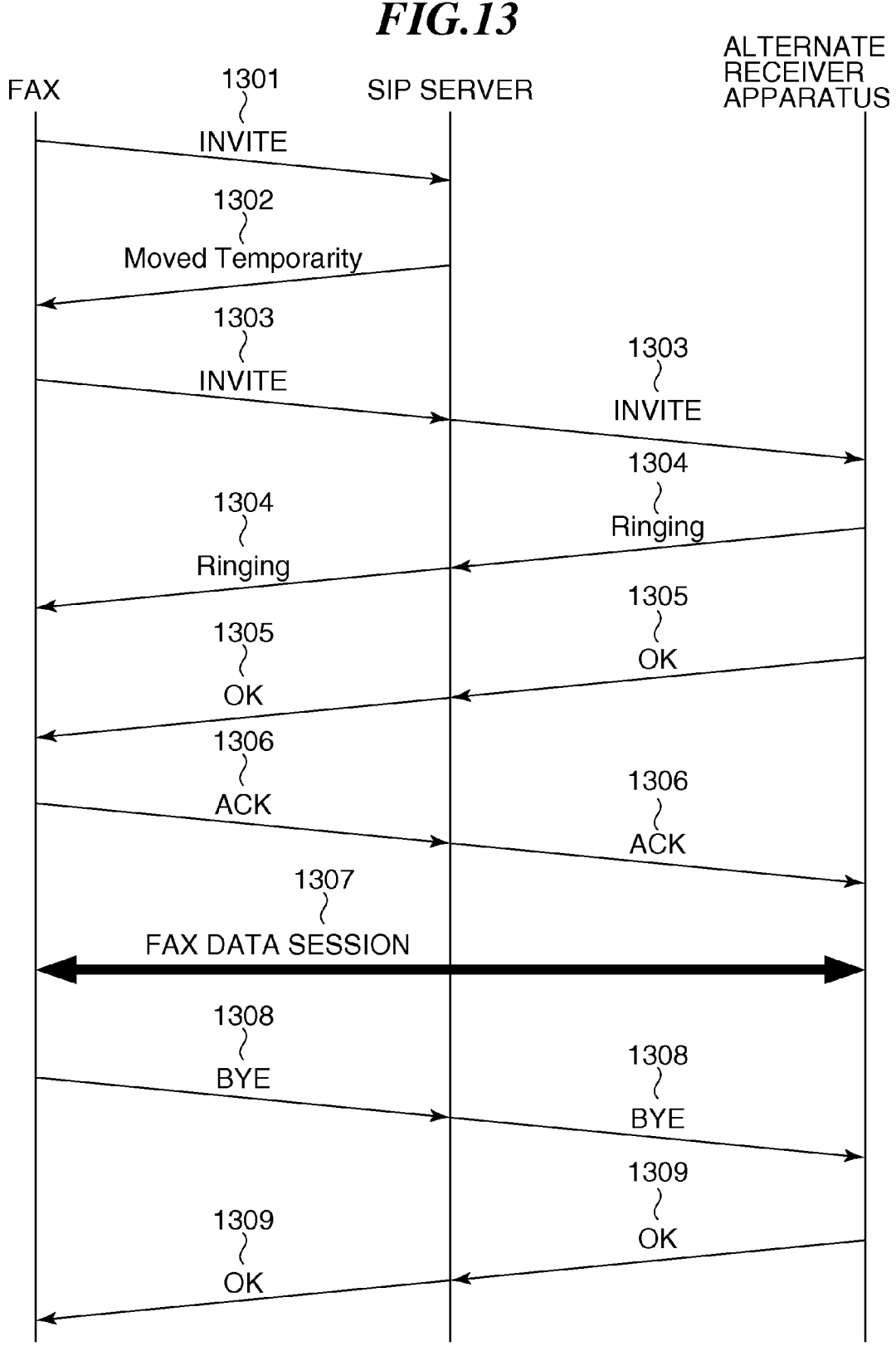
FIG. 13 is a sequence diagram showing an example of a facsimile data alternate reception process performed by the alternate receiver apparatus.

It is assumed as shown in FIG. 13 that the FAX 105 transmits to the IP communication network 112 an INVITE message 1301 for establishing a session with the transmission destination MFP 102 having the URI of sip:+8112-345-6781@abc.com. The INVITE message 1301 is received by the SIP server 113.

The redirect server 115 in the SIP server 113 recognizes that the URI "sip:+8112-345-6782@abc.com" of the MFP 103 (alternate receiver apparatus) is registered in the location server 117, as the transfer destination of facsimile data originally directed to the MFP 102.

Thus, the SIP server 113 sends back to the FAX 105 a Moved Temporarily message 1302 including the URI of the MFP 103 (alternate receiver apparatus) which is a redirect (transfer) destination of facsimile data originally directed to the MFP 102.

Based on the moved temporarily message, the FAX 105 transmits to the IP communication network 112 an INVITE message 1303 for establishing a session with the alternate receiver apparatus having the URI contained in the message.

The INVITE message 1303 is received by the SIP server 113 where the redirect server 115 recognizes that the URI of the alternate receiver apparatus registered in the location server 117 corresponds to the MFP 103, which is connected to the UNI 120.

The SIP server 113 transfers the received INVITE message 1303 to the MFP 103 (alternate receiver apparatus).

When receiving the INVITE message 1303, the alternate receiver apparatus (MFP 103) controls the SIP call controller 211 to transmit to the FAX 105 a Ringing message 1304 indicating that ringing is being performed. The Ringing message 1304 is transmitted to the FAX 105 via the IP communication network 112, the SIP server 113, etc.

The FAX 105 recognizes from the Ringing message 1304 that the URI "sip:+8112-345-6782@abc.com" of the alternate receiver apparatus (MFP 103), which is the transfer destination, is being called.

After transmitting the Ringing message 1304 to the FAX 105, the alternate receiver apparatus transmits an OK message 1305 to the FAX 105 when it is ready for facsimile data alternate reception. When confirming reception of the OK message 1305, the FAX 105 transmits an ACK message 1306 to the alternate receiver apparatus.

The alternate receiver apparatus (MFP 103) recognizes the ACK message 1306, and a communication session (line connection) 1307 is established between the FAX 105 and the alternate receiver apparatus, whereby facsimile data communication can be possible.

At completion of facsimile data transmission, the FAX 105 transmits to the alternate receiver apparatus (MFP 103) a BYE message 1308 indicating the completion of communication. The alternate receiver apparatus transmits an OK message 1309 to the FAX 105 in reply to the BYE message 1308, thereby completing the facsimile communication between the FAX 105 and the alternate receiver apparatus.

Figure 14:
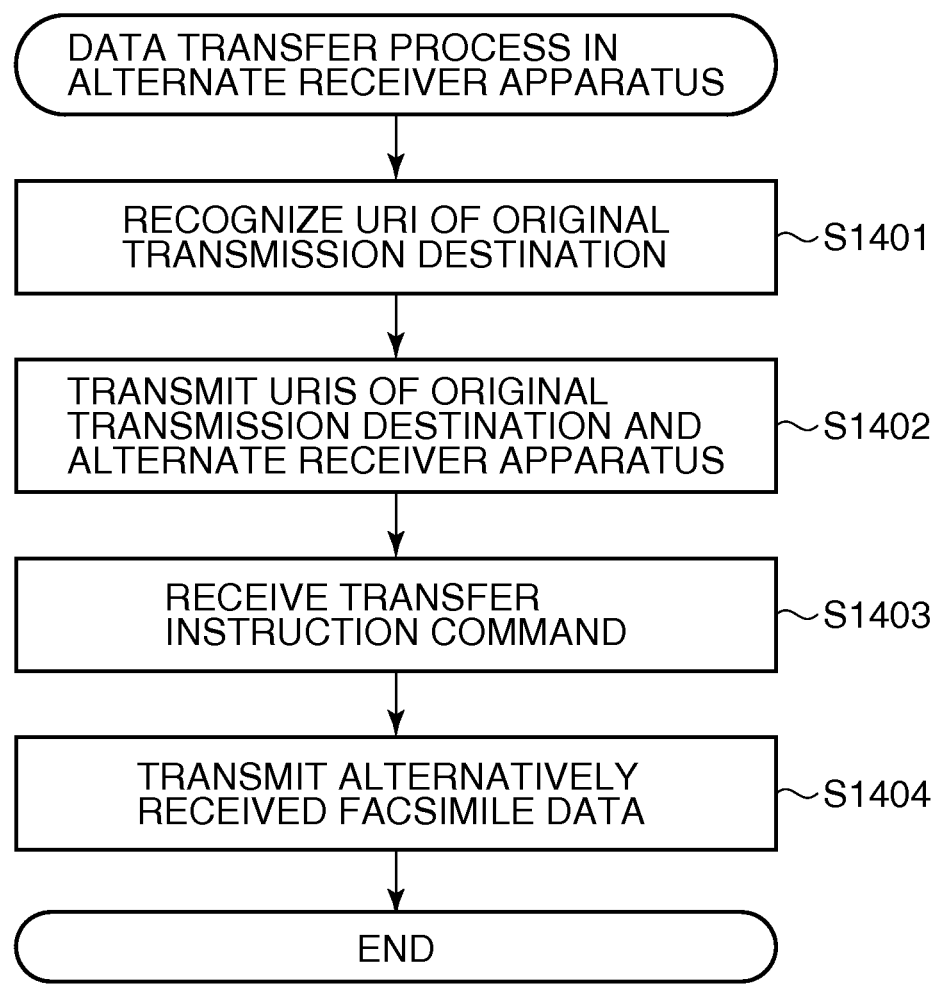
FIG. 14 is a flowchart showing a transfer process performed by the alternate receiver apparatus to transfer alternatively received data to an original transmission destination.
Figure 15:
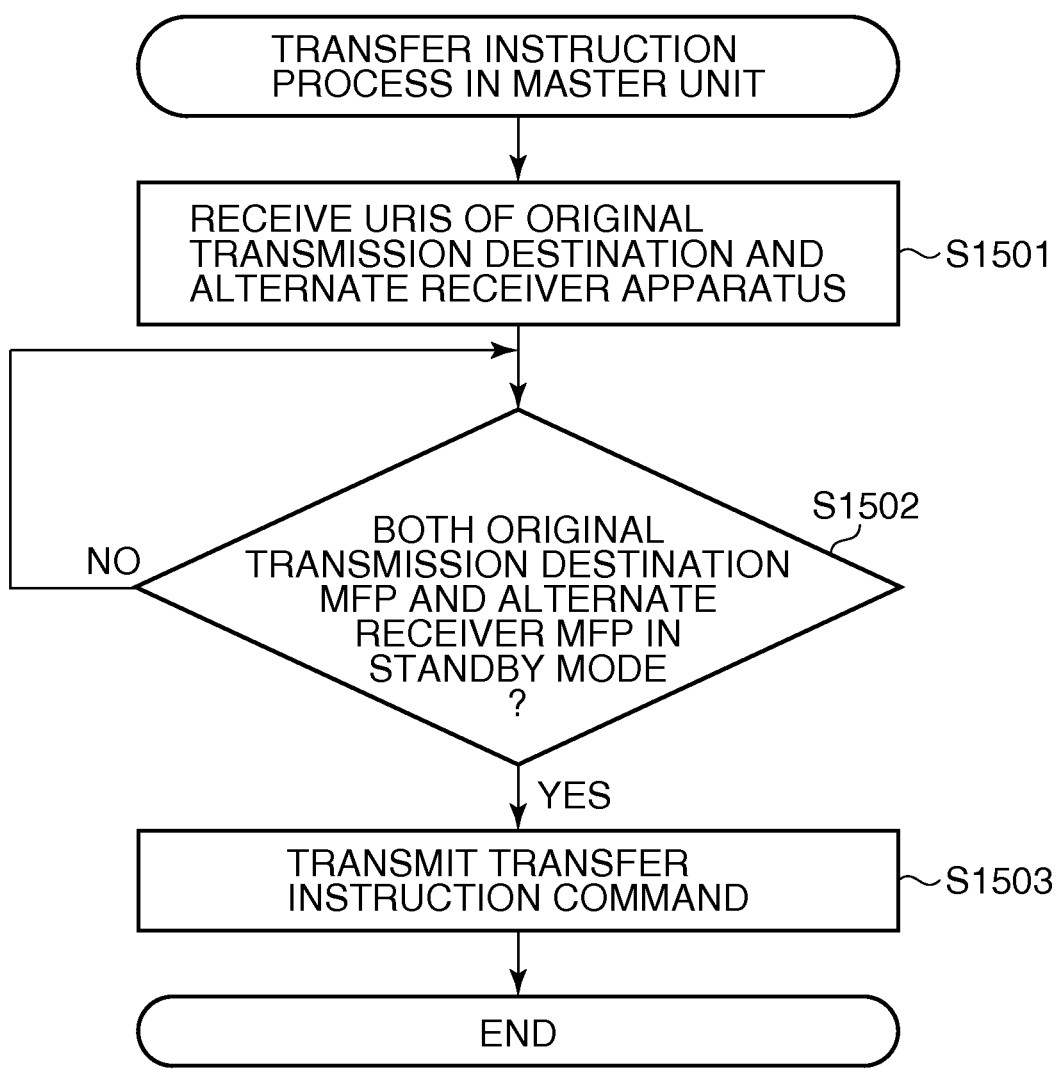
FIG. 15 is a flowchart showing a transfer instruction process performed by the master unit.

Next, with reference to FIGS. 14 to 16, a description will be given of the procedures of a transfer process where facsimile data alternatively received by the alternate receiver apparatus is transferred to the original transmission destination MFP (principal apparatus). The transfer process is performed by cooperative operations of the master unit and the alternate receiver apparatus.

First, a transfer process performed by the alternate receiver apparatus (MFP 103) is described with reference to FIG. 14.

Based on the content of the INVITE message 1303 in FIG. 13, the alternate receiver apparatus recognizes that the URI of the original transmission destination MFP is "sip:+8112-345-6781@abc.com" which is the URI of the MFP 102 (S1401). Thus, the alternate receiver apparatus transmits to the master unit (MFP 101) the URI of the original transmission destination MFP 102 of the alternatively received facsimile data and the own URI "sip:+8112-345-6782@abc.com" (S1402).

Next, the alternate receiver apparatus receives a transfer instruction command, described later, from the master unit (S1403), and transmits the alternatively received facsimile data to the original transmission destination MFP 102 (principal apparatus) (S1404).

Next, a transfer instruction process performed by the master unit is described with reference to FIG. 15.

The master unit (MFP 101) receives the URI of the MFP 102 (which is the original transmission destination of the facsimile data) and the URI of the alternate receiver apparatus from the alternate receiver apparatus (MET 103) (S1501). Next, the master unit determines whether both the original transmission destination MET 102 (principal apparatus) and the alternate receiver apparatus (MET 103) operate in the standby mode (S1502).

Since the original transmission destination MFP (MFP 102) operates in the deep sleep mode at the time of redirect registration, it is supposed that a time period elapsing from the redirect registration to the standby mode being restored becomes considerably long. Thus, the master unit periodically performs the determination in step S1502.

It should be noted that the alternate receiver apparatus is able to freely perform power supply mode transition in accordance with a condition for its power supply mode transition even while it is being selected as alternate receiver apparatus.

When confirming that both the original transmission destination MET and the alternate receiver apparatus are in the standby mode, the master unit transmits to the alternate receiver apparatus a transfer instruction command to instruct the alternate receiver apparatus to transfer the alternatively received facsimile data to the original transmission destination MET (step S1503).

Figure 16:
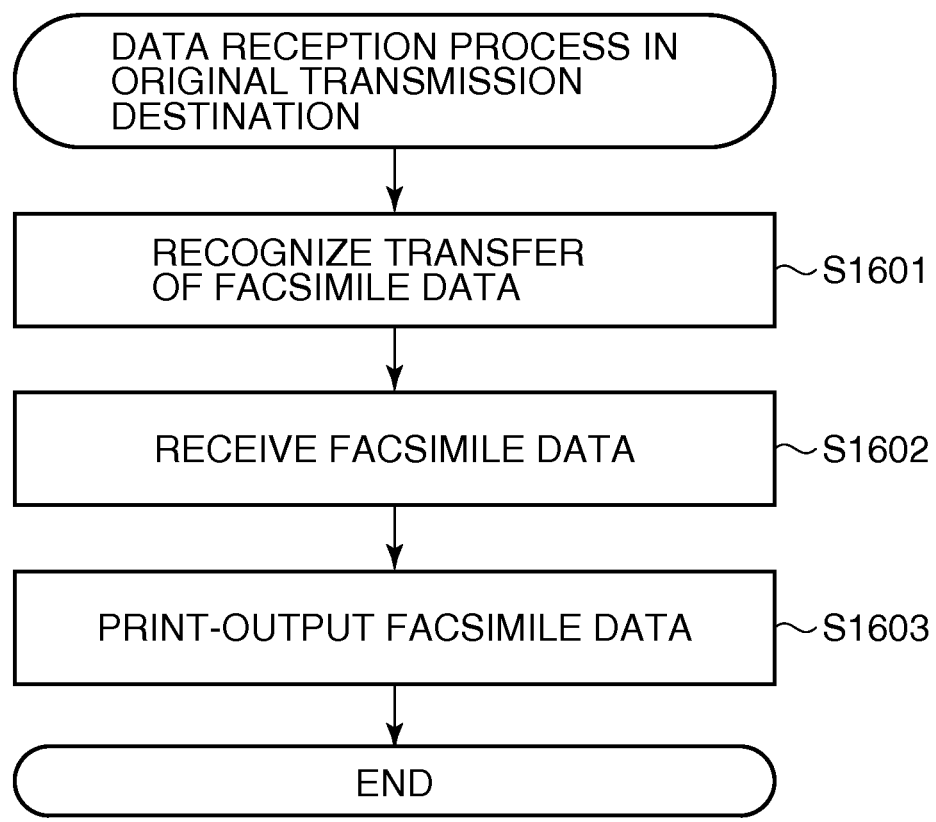
FIG. 16 is a flowchart showing a data reception process performed by the original transmission destination.

The original transmission destination MET (MET 102) recognizes transfer of facsimile data from the alternate receiver apparatus (MET 103) and receives transferred facsimile data (steps S1601 and S1602 in FIG. 16). Then, the original transmission destination MFP (principal apparatus) print-outputs the received facsimile data (step S1603).

As described above, the alternatively received data is transferred to the original transmission destination on condition that both the original transmission destination and the alternate receiver apparatus are in the standby mode, whereby the original transmission destination and the alternate receiver apparatus can remain in the sleep mode or the deep sleep mode for a longest possible time period. As a result, the efficiency of reduction in power consumption can be made higher.

As described above, in this embodiment, URIs of MFPs which are in the sleep mode or the deep sleep mode are registered in the SIP server, and facsimile data whose transmission destination is any of these MFPs is transferred to and alternatively received by an MFP designated as a substitute apparatus. As the substitute apparatus, an MFP which is in the standby mode is preferentially selected.

As a result, each of MFPs in the sleep mode or the deep sleep mode is not required to be shifted to the standby mode or the sleep mode each time facsimile data directed thereto is transmitted. In other words, a plurality of information processing apparatuses connected to the network are able to cooperate with one another to efficiently achieve power saving of these apparatuses as a whole.

In the description based on FIG. 11, a case has been described where if it is determined in step S1104 that there is no MEP which is in the standby mode, an MFP which is the lowest in power consumption at printing operation is selected as an alternate receiver apparatus from among all the MFPs (master and slave units). Alternatively, an MFP whose facsimile reception mode is set to the memory reception mode can be selected as the alternate receiver apparatus. In that case, even if the selected MFP is in the sleep mode or the deep sleep mode when it receives facsimile data, the selected MFP is not required to make a shift to the standby mode, and therefore, a power saving effect can be attained.

Even when an MFP whose URI is currently registered in the SIP 113 shifts from the standby mode to the sleep mode, it is unnecessary to designate the MFP as an principal apparatus, if the MFP is in the memory reception mode. This is because when the MFP which is in the memory reception mode receives facsimile data, it is unnecessary for the MFP to make a shift to the standby mode. Power saving effect can be attained without requiring registration of alternate reception.

This invention is not limited to the above described embodiment. In a case, for example, that a large number of apparatuses each having a facsimile communication function are connected to the network, it is possible to provide two or more alternate receiver apparatuses (substitute apparatuses).

The technical concept described in the embodiment can be applied to a communication system where not only MFPs but also various information processing apparatuses or peripherals each having a facsimile communication function are connected to the network.

The facsimile data transfer control for alternate reception can be carried out not only by a SIP server but also by a server whose transfer function is based on other protocol such as HTTP protocol.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-037886, filed Feb. 20, 2009, which is hereby incorporated by reference herein in its entirety.

What is claimed is:

1. A management apparatus for managing a plurality of facsimile apparatuses each at least having a normal power mode and a power saving mode where power consumption is smaller than in the normal power mode and receiving facsimile data via a SIP server, comprising:
a detection unit configured to detect current power modes of the plurality of facsimile apparatuses;
a selection unit configured to select at least one facsimile apparatus for externally receiving facsimile data from among the plurality of facsimile apparatuses based on a result of detection by said detection unit; and
a registration unit configured to register identification information representing the selected facsimile apparatus to the SIP server, so as to cause the selected facsimile apparatus to receive the facsimile data via the SIP server;
wherein the detection unit, the selection unit, and the registration unit are implemented, at least in part, by one or more hardware processors; wherein the plurality of facsimile apparatuses include at least one particular facsimile apparatus,
in a case where at least one of the at least one particular facsimile apparatus operates in the power saving mode, said selection unit selects at least one of at least one facsimile apparatus other than the particular facsimile apparatus operating in the power saving mode, as the at least one facsimile apparatus for externally receiving facsimile data, and
the selected facsimile apparatus receives facsimile data on behalf of the particular facsimile apparatus operating in the power saving mode.

2. The management apparatus according to claim 1, wherein in a case where at least one of the at least one particular facsimile apparatus operates in the power saving mode, said selection unit selects, from among the plurality of facsimile apparatuses, at least one of at least one facsimile apparatus that operates in the normal power mode as the at least one facsimile apparatus for externally receiving facsimile data.

3. The management apparatus according to claim 2, further including:
a recognition unit configured to recognize the number of facsimile apparatuses that operate in the normal power mode among the plurality of facsimile apparatuses;
wherein in a case where it is determined by said recognition unit that the number of facsimile apparatuses operating in the normal power mode is one, said selection unit selects the facsimile apparatus that operates in the normal power mode, as the at least one facsimile apparatus for externally receiving facsimile data.

4. The management apparatus according to claim 2, further including:
a recognition unit configured to recognize the number of facsimile apparatuses that operate in the normal power mode among the plurality of facsimile apparatuses;
wherein in a case where it is determined by said recognition unit that the number of facsimile apparatuses operating in the normal power mode is two or more, said selection unit selects at least one of the facsimile apparatuses operating in the normal power mode, which is smaller in power consumption in the normal power mode, as the at least one facsimile apparatus for externally receiving facsimile data.

5. The management apparatus according to claim 2, further including:
a recognition unit configured to recognize the number of facsimile apparatuses that operate in the normal power mode among the plurality of facsimile apparatuses;
wherein in a case where it is determined by said recognition unit that the number of facsimile apparatuses operating in the normal power mode is zero, said selection unit selects at least one of the plurality of facsimile apparatuses, which is smaller in power consumption in the normal power mode, as the at least one facsimile apparatus for externally receiving facsimile data.

6. The management apparatus according to claim 2, further including:
a recognition unit configured to recognize the number of facsimile apparatuses that operate in the normal power mode among the plurality of facsimile apparatuses;
wherein the plurality of facsimile apparatus are each configured to be selectively set to either a normal reception mode where received facsimile data is output or a memory reception mode where received facsimile data is not output but stored in a memory, and in a case where it is determined by said recognition unit that the number of facsimile apparatuses operating in the normal power mode is zero, said selection unit selects at least one of the plurality of facsimile apparatuses, which is set to the memory reception mode, as the at least one facsimile apparatus for externally receiving facsimile data.

7. The management apparatus according to claim 1, wherein the server is a call control server that performs call control between the plurality of facsimile apparatuses and an external facsimile apparatus.

8. The management apparatus according to claim 7, wherein the call control server is configured to perform the call control between the plurality of facsimile apparatuses and the external facsimile apparatus in accordance with a session initiation protocol.

9. The management apparatus according to claim 1, wherein the management apparatus is provided in any one of the plurality of facsimile apparatuses.

10. A control method of a management apparatus for managing a plurality of facsimile apparatuses each at least having a normal power mode and a power saving mode where power consumption is smaller than in the normal power mode and receiving facsimile data via a SIP server, comprising:
   a detection step of detecting current power modes of the plurality of facsimile apparatuses;
   a selection step of selecting at least one facsimile apparatus for externally receiving facsimile data from among the plurality of facsimile apparatuses based on a result of detection in said detection step; and
   a registration step of registering identification information representing the selected facsimile apparatus to the SIP server, so as to cause the selected facsimile apparatus to receive the facsimile data via the SIP server; wherein the plurality of facsimile apparatuses include at least one particular facsimile apparatus,
   in a case where at least one of the at least one particular facsimile apparatus operates in the power saving mode, said selection unit selects at least one of at least one facsimile apparatus other than the particular facsimile apparatus operating in the power saving mode, as the at least one facsimile apparatus for externally receiving facsimile data, and
   the selected facsimile apparatus receives facsimile data on behalf of the particular facsimile apparatus operating in the power saving mode.

11. A non-transitory computer-readable storage medium storing a program for causing a computer to execute a control method of a management apparatus for managing a plurality of facsimile apparatuses each at least having a normal power mode and a power saving mode where power consumption is smaller than in the normal power mode and receiving facsimile data via a SIP server, the control method comprising:
   a detection step of detecting current power modes of the plurality of facsimile apparatuses;
   a selection step of selecting at least one facsimile apparatus for externally receiving facsimile data from among the plurality of facsimile apparatuses based on a result of detection in said detection step; and
   a registration step of registering identification information representing the selected facsimile apparatus to the SIP server, so as to cause the selected facsimile apparatus to receive the facsimile data via the SIP server; wherein the plurality of facsimile apparatuses include at least one particular facsimile apparatus,
   in a case where at least one of the at least one particular facsimile apparatus operates in the power saving mode, said selection unit selects at least one of at least one facsimile apparatus other than the particular facsimile apparatus operating in the power saving mode, as the at least one facsimile apparatus for externally receiving facsimile data, and
   the selected facsimile apparatus receives facsimile data on behalf of the particular facsimile apparatus operating in the power saving mode.

\* \* \* \* \*